United States Patent
Shah et al.

(10) Patent No.: US 12,346,906 B2
(45) Date of Patent: Jul. 1, 2025

(54) METHOD, APPARATUS AND COMPUTER PROGRAM PRODUCT FOR REPORTING AN EXCHANGE OF MESSAGES BETWEEN NODES IN A NETWORK

(71) Applicant: Vocalink Limited, London (GB)

(72) Inventors: Syed Asim Ali Shah, Harrow (GB); David William Divitt, Eye (GB)

(73) Assignee: Vocalink International Limited, London (GB)

( * ) Notice: Subject to any disclaimer, the term of this patent is extended or adjusted under 35 U.S.C. 154(b) by 233 days.

(21) Appl. No.: 17/548,808

(22) Filed: Dec. 13, 2021

(65) Prior Publication Data

US 2022/0198456 A1 Jun. 23, 2022

(30) Foreign Application Priority Data

Dec. 23, 2020 (GB) .................................... 2020525

(51) Int. Cl.
*G06Q 20/40* (2012.01)
*H04L 51/216* (2022.01)

(52) U.S. Cl.
CPC ....... *G06Q 20/4016* (2013.01); *H04L 51/216* (2022.05)

(58) Field of Classification Search
CPC .. G06Q 20/4016; G06Q 20/00; G06Q 20/389; H04L 51/216; H04L 63/00;

(Continued)

(56) References Cited

U.S. PATENT DOCUMENTS 11,526,933 B1 * 12/2022 Adapala ............... G06Q 20/108
2008/0082454 A1 * 4/2008 Dilip .................... G06Q 20/102
705/76

(Continued)

FOREIGN PATENT DOCUMENTS

EP 2689384 1/2014
EP 3570185 11/2019

(Continued)

OTHER PUBLICATIONS

International Search Report and Written Opinion for PCT Application No. PCT/EP2021/082017 (Mar. 3, 2022).

(Continued)

*Primary Examiner* — Christopher B Robinson
*Assistant Examiner* — Tania M Pena-Santana
(74) *Attorney, Agent, or Firm* — Hovey Williams LLP

(57) ABSTRACT

A method, apparatus and computer program product for reporting an exchange of messages between nodes in a network is provided by the present disclosure, the method comprising: receiving from a first device, using circuitry, a request for data for a target node, the data indicative of an exchange of messages between nodes in a network linked to the target node determining, by the circuitry, whether a request for data for the target node has previously been received; and, when a request for data for the target node has previously been received, the method comprises: building, by the circuitry, data indicative of the exchange of messages between nodes in the network linked to the target node; identifying, by the circuitry, a new portion of the data based on a comparison of the data with previous data which has been built for the target node; and reporting to the first device, by the circuitry, the new portion of the data.

17 Claims, 6 Drawing Sheets

(58) Field of Classification Search
CPC ....... H04L 67/535; H04L 43/06; H04L 51/00; H04L 67/1095; H04L 43/04; G06F 11/3079; G06F 16/178; G06F 16/27
See application file for complete search history.

(56) References Cited

U.S. PATENT DOCUMENTS

| | | | |
|---|---|---|---|
| 2013/0218765 A1* | 8/2013 | Hammad | G06Q 20/326 705/41 |
| 2015/0073981 A1* | 3/2015 | Adjaoute | G06Q 20/384 705/39 |
| 2016/0132886 A1* | 5/2016 | Burke | G06Q 20/3827 705/44 |
| 2016/0364794 A1 | 12/2016 | Chari et al. | |
| 2017/0228706 A1* | 8/2017 | Parziale | G06Q 20/3223 |
| 2020/0106688 A1* | 4/2020 | Dewar | G06Q 20/389 |
| 2020/0106689 A1 | 4/2020 | Dewar | |
| 2021/0400066 A1* | 12/2021 | Sood | H04L 63/1425 |

FOREIGN PATENT DOCUMENTS

| | | |
|---|---|---|
| EP | 3629273 | 4/2020 |
| GB | 2509433 | 7/2014 |

OTHER PUBLICATIONS

UK Search Report for Application No. GB2020525.8 entitled A Method, Apparatus and Computer Program Product for Reporting an Exchange of Messages Between Nodes in a Network (dated Jun. 22, 2021).

* cited by examiner

METHOD, APPARATUS AND COMPUTER PROGRAM PRODUCT FOR REPORTING AN EXCHANGE OF MESSAGES BETWEEN NODES IN A NETWORK

CROSS REFERENCE TO RELATED APPLICATIONS

This application claims priority to United Kingdom Application No. 2020525.8, filed Dec. 23, 2020, which is incorporated herein by reference in its entirety

BACKGROUND

Field of the Disclosure

The present disclosure relates to a method, apparatus and computer program product for reporting an exchange of messages between nodes in a network.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Banking fraud and scamming is an increasing problem. In a typical fraud or scam, a perpetrator of the fraud will illegally obtain funds from a victim's bank account. This may be via a "phishing" or "malware" attack, where access to the victim's banking accounts or facilities is obtained. For example, a perpetrator of a fraud or scam may access a victim's account or deceptively obtain funds via the victim transferring the funds into the perpetrator's bank account.

After the funds have been transferred from the victim's account, the perpetrator will transfer funds through numerous other bank accounts. These other bank accounts may be legitimate bank accounts which have also been compromised, bank accounts set up using illegally obtained documents (such as a stolen or fake passport), or may be bank accounts rented from a third party to be used for illicit purposes.

The speed at which the funds are transferred between these accounts following banking fraud is usually very high. Typically, a transfer between multiple bank accounts may be completed within a few minutes.

The transfer of funds occurs for two reasons. The first reason is to make tracing of funds more difficult. That is, since investigation into banking fraud is often done manually using a limited data view from each bank, it can be difficult to trace the movement of funds originating from an initial fraudulent transaction across the banking network. The second reason is to disperse the money from the initial fraudulent transaction. This allows a perpetrator to use the money more easily without arousing suspicion (such as by withdrawing small amounts of money as cash from an Automated Teller Machine (ATM)).

Published patent applications EP3629273A1 and EP362955A1 describe methods which can build a set of traceable messages through a network of nodes. The contents of EP3629273A1 and EP362955A1 are incorporated by reference. In the present disclosure, the contents of EP3629273A1 and EP362955A1 relating to building the set of traceable messages are incorporated by reference. These methods can be used in order to trace the dispersion funds from an initial fraudulent application across a banking network.

However, banking networks are very complex and comprise a very large number of individual accounts. Moreover, the number of transactions between the accounts in the banking network can be very high. Indeed, in an economy such as that of the United Kingdom, the number of transactions occurring between accounts could reach a rate of around 300 transactions per second. Owing to the number of transactions and complexity of the banking network, the trail of dispersion of funds from an initial fraudulent transaction can become very complex in a short period of time.

Moreover, owing to the nature of the investigations when tracing fraudulent transactions, it is important that parties interested in the dispersion of funds from an initial fraudulent transaction (such as banks, other financial institutions, case workers or investigators) receive the most up-to-date and relevant information regarding a potential fraudulent account or transaction, such that they can build a thorough and complete case against the fraudsters.

However, it can be increasingly difficult to provide this information to the interested parties as the number of linked accounts and the number of interested parties increases.

It is an aim of the present disclosure to address these issues.

SUMMARY

In accordance with a first aspect of the present disclosure, a method of reporting an exchange of messages between nodes in a network is provided, the method comprising: receiving from a first device, using circuitry, a request for data for a target node, the data indicative of an exchange of messages between nodes in a network linked to the target node; determining, by the circuitry, whether a request for data for the target node has previously been received; and, when a request for data for the target node has previously been received, the method comprises: building, by the circuitry, data indicative of the exchange of messages between nodes in the network linked to the target node; identifying, by the circuitry, a new portion of the data based on a comparison of the data with previous data which has been built for the target node; and reporting to the first device, by the circuitry, the new portion of the data.

In accordance with a second aspect of the present disclosure, an apparatus for reporting an exchange of messages between nodes in a network is provided, the apparatus comprising circuitry configured to: receive from a first device a request for data for a target node, the data indicative of an exchange of messages between nodes in a network linked to the target node; determine whether a request for data for the target node has previously been received; and, when a request for data for the target node has previously been received, the circuitry is further configured to: build data indicative of the exchange of messages between nodes in the network linked to the target node; identify a new portion of the data based on a comparison of the data with previous data which has been built for the target node; and report to the first device the new portion of the data.

In accordance with a third aspect of the present disclosure, a computer program product comprising instructions which, when the instructions are implemented by a computer, cause the computer to perform a method of reporting an exchange of messages between nodes in a network is provided, the method comprising: receiving from a first device a request for data for a target node, the data indicative of an exchange of messages between nodes in a network linked to the target node; determining whether a request for data for the target node has previously been received; and, when a request for data for the target node has previously been received, the method comprises: building data indicative of the exchange of messages between nodes in the network linked to the target node; identifying a new portion of the data based on a comparison of the data with previous data which has been built for the target node; and reporting to the first device the new portion of the data.

Embodiments of the disclosure reduce the overheads and volume of data which must be transmitted when reporting data regarding a target account. That is, by identifying and reporting only the new portion of the data, the overheads and volume of data which must be communicated across the network can be significantly reduces. This improves the efficiency of the process and enables the most up-to-date relevant information to be provided to interested parties even when the number of linked accounts and/or the number of interested parties becomes high. Of course, the present disclosure is not particularly limited to the aforementioned advantageous technical effects. Other advantageous technical effects will become apparent to the skilled person when reading the disclosure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
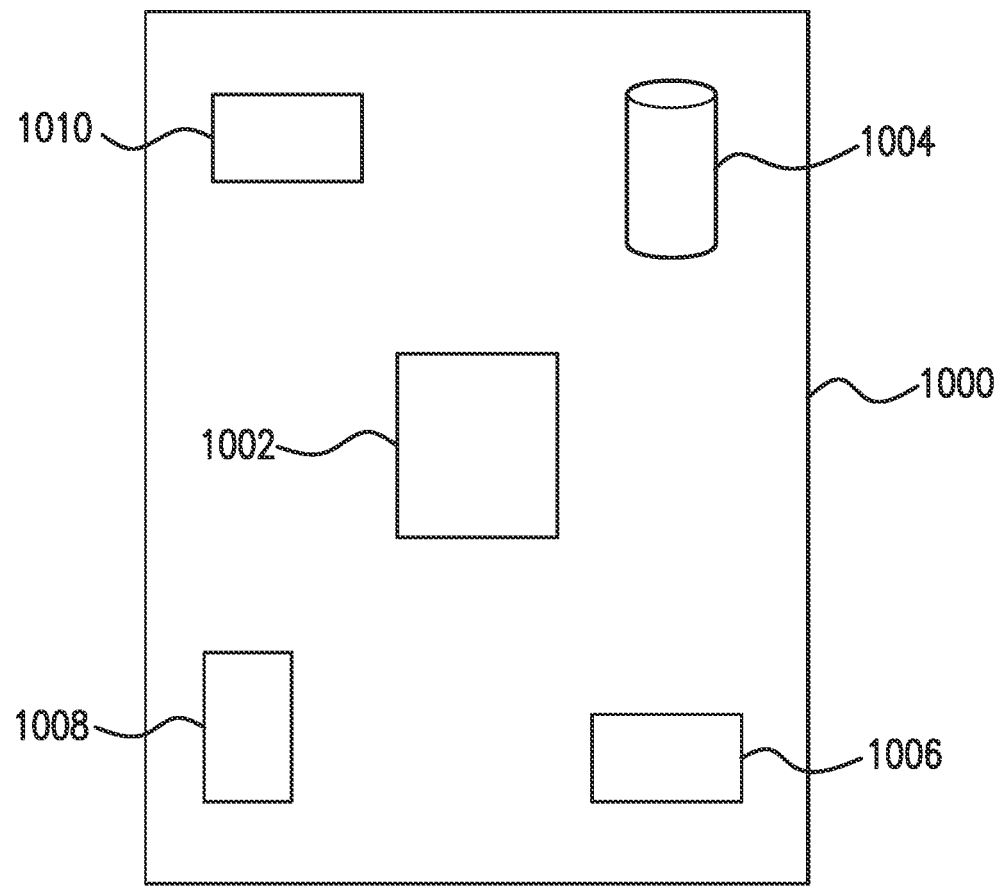
FIG. 1 illustrates an apparatus according to embodiments of the disclosure.

Referring now to the drawings, wherein like reference numerals designate identical or corresponding parts throughout the several views.

Referring to FIG. 1, an apparatus 1000 according to embodiments of the disclosure is shown. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1002.

The processing circuitry 1002 may be a microprocessor carrying out computer instructions or may be an Application Specific Integrated Circuit. The computer instructions are stored on storage medium 1004 which may be a magnetically readable medium, optically readable medium or solid state type circuitry. The storage medium 1004 may be integrated into the apparatus 1000 (as shown) or, alternatively, may be separate to the apparatus 1000 and connected thereto using either a wired or wireless connection. The computer instructions may be embodied as computer software that contains computer readable code which, when loaded onto the processor circuitry 1002, configures the processor circuitry 1002 to perform a method according to embodiments of the disclosure.

Now, additionally connected to the processor circuitry 1002, is a user input 1006. The user input 1006 may be a touch screen or maybe a mouse or stylist type input device. The user input 1006 may also be a keyboard or any combination of these devices.

A network connection 1008 is also coupled to the processor circuitry 1002. The network connection 1008 may be a connection to a Local Area Network or a Wide Area Network such as the Internet or a Virtual Private Network or the like. The network connection 1008 may be connected to banking infrastructure allowing the processor circuitry 1002 to communicate with other banking institutions to obtain relevant data or provide relevant data to the institutions. The network connection 1008 may therefore be behind a firewall or some other form of network security. Indeed, network connection 1008 may be used to perform encrypted communication with a connected device.

Additionally coupled to the processing circuitry 1002, is a display device 1010. The display device, although shown integrated into the apparatus 1000, may additionally be separate to the apparatus 1000 and may be a monitor or some kind of device allowing the user to visualise the operation of the system. In addition, the display device 1010 may be a printer or some other device allowing relevant information generated by the apparatus 1000 to be viewed by the user or by a third party.

A more specific configuration of the apparatus 1000 according to embodiments of the disclosure will be described with reference to the following description and drawings.

Figure 2:
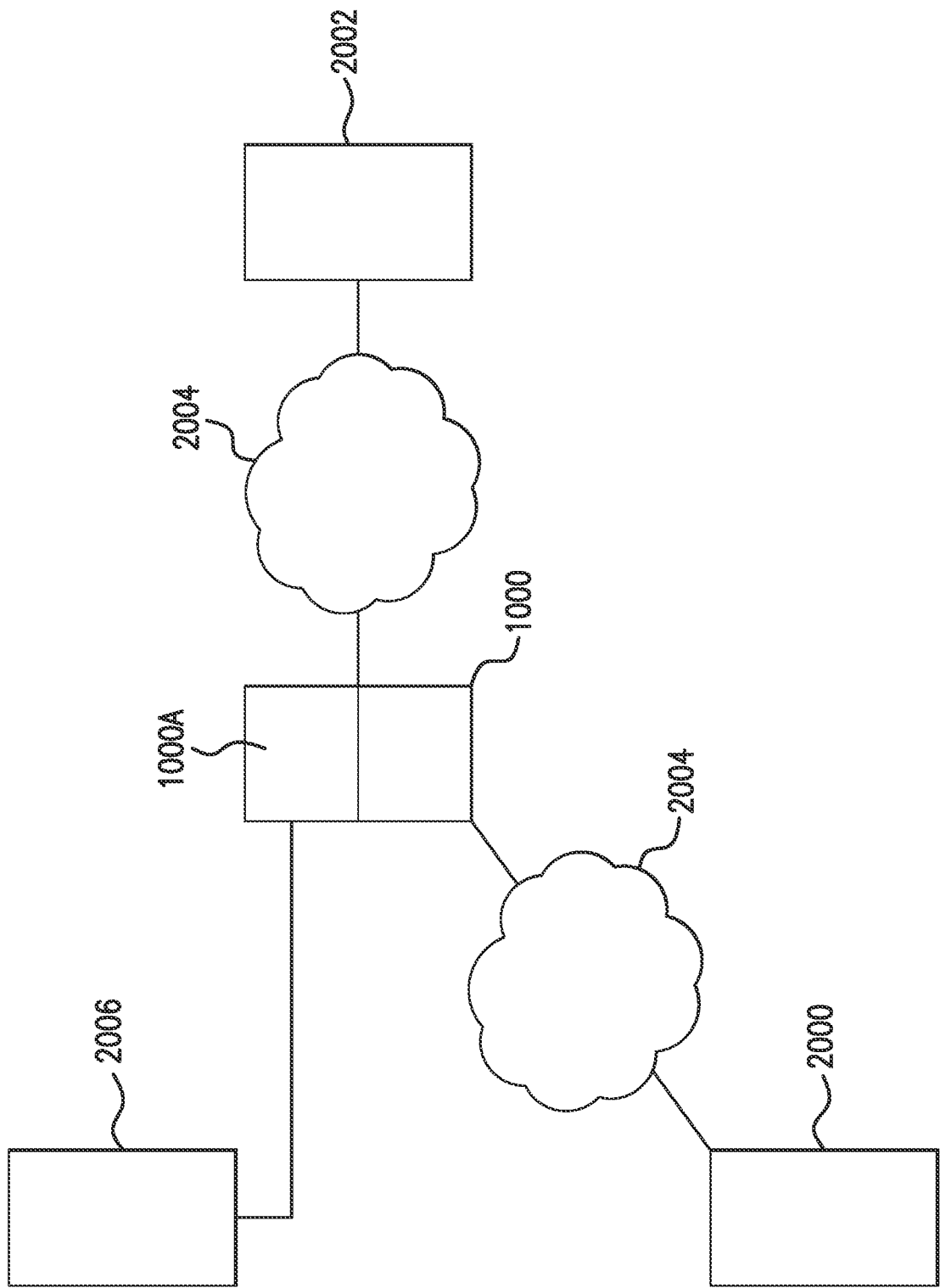
FIG. 2 illustrates an example network according to embodiments of the disclosure.

Referring now to FIG. 2 of the present disclosure, an example network according to embodiments of the disclosure is illustrated.

In this example illustrated in FIG. 2, a server 1000A is located in a network. The network may be a banking network, for example. Additionally, a first device 2000 may be connected to server 1000A over a communication interface 2004 (such as the internet or secure communication or the like). A second device 2002 may also be connected to the server 1000A over a communication interface 2004. This enables the server 1000A to exchange information with each of the first device 2000 and the second device 2002 respectively.

In this example, each of the first and the second device may be a financial institution such as a bank or the like. Moreover, each of the first and second device has a number of associated accounts (such as bank accounts) which can be used in order to exchange messages with other accounts over the banking network. Accordingly, the accounts which are associated with/held by each of the first and second device form nodes on the banking network. Indeed, in this example, each account may itself be associated with a certain value of funds. The owner of an account may therefore authorise a transaction in order to transfer a certain portion of those funds from their account to another account on the network. Such a transaction may occur between accounts which are held by an individual financial institution (such as between two accounts held by first device 2000). Alternatively, such a transaction may occur between two accounts which are held by different financial institutions (such as between a first account held by first device 2000 and a second account held by second device 2002).

In this example, whenever there is a message exchanged between accounts (e.g. a transaction between the accounts) server 1000A is notified of the exchange. Such a notification may comprise information such as the source account (being the account from which the transaction originated), the destination account (being the account to which the transaction is directed) and a message value (such as the size or value of the transaction). However, the notification information is not limited to this information. For example, the notification may also include the date and time of the transaction and/or a unique identifier of the transaction, for example.

Once notified of a transaction, server 1000A may store the information in a storage such as an external database 2006. In this manner, every time a message is exchanged between nodes of the network, the server 1000A may add the information regarding the exchange to the database 2006 or other form of storage.

The transactions between bank accounts in this example can be considered as a stream consisting of a sequence of transactions between bank accounts of the network. In an economy such as the United Kingdom, the number of transactions between accounts could reach a rate of around 300 transactions per second. As such, the number of transactions recorded between bank accounts in the banking network can be very high.

A method for building a set of traceable messages through a network of nodes is described in published patent applications EP3629273A1 and EP362955A1. The contents of EP3629273A1 and EP362955A1 are incorporated by reference. In embodiments, the contents of EP3629273A1 and EP362955A1 relating to building the set of traceable messages (including the specific example of building the dispersion tree) are incorporated by reference. A dispersion tree is a specific example of data indicative of the exchange of messages between nodes in a network.

The method of building a set of traceable messages through a network of nodes described in EP3629273A1 and EP362955A1 can therefore be used in order to convert the stream of transactions between accounts into a set of connected transactions, thereby tracing the transfer of funds through the network. When a transaction from the stream of transactions is received (such as a transaction from a first account held by first device 2000 and a second account held by second device 2002), the method comprises determining a set of previous transaction through the network with which the received transaction is associated. The set of previous transactions may be referred to as a dispersion tree. In other words, for each transaction which is received (identified by the unique transaction identifier for each transaction), an outbound message is produced which describes the set of previous messages or transaction the received transaction belongs to or is a member of. This information may also be stored in the external database 2006 or other storage. Therefore, while the transactions are identified and recorded as they occur, analysis of the links between the accounts is not performed at that stage.

It will be appreciated that the present disclosure is not particularly limited to the number of devices (i.e. the first and second device) illustrated in this example. In a banking network, there may be significantly more devices than illustrated in this example. Moreover, the method of building a set of traceable messages through the network (such as transactions between bank accounts in the banking network) is not particularly limited to the example method described in published EP3629273A1 and EP362955A1. Indeed, any suitable method may be used in order to trace the transactions through the network as required depending on the situation to which embodiments of the disclosure are applied.

Now, in this example, consider that a first account, or transaction, is identified as being associated or linked with fraudulent activity. More specifically, consider that a perpetrator of fraud has accessed a victim's account or deceptively obtained funds via the victim transferring the funds into the perpetrator's bank account. In this situation, a financial institution (such as the operator of the first device 2000) The may have interest in tracing the accounts and transactions which are associated with the fraudulent activity, such that money can be stopped leaving those accounts and, ultimately, those accounts can be closed. In this situation, the first device may request that the server 1000A provides a dispersion tree (based on the set of traceable messages which has been generated) which describes the set of messages or transactions that the target account (being the potentially fraudulent account) is linked to. This may be used as part of an investigation into the potentially fraudulent transaction in order to build a case against the fraudsters.

Owing to the nature of the investigations when tracing fraudulent transactions, it is important that parties interested in the dispersion of funds from an initial fraudulent or potentially fraudulent transaction (such as banks, other financial institutions, case workers or investigators) receive the most up-to-date and relevant information regarding a the fraudulent or potentially fraudulent transaction. This ensures that they build the most thorough case against the fraudsters. However, the investigation may take a number of hours or days in order to complete. During this time, the fraudsters may engage in a number of additional transactions to further disperse the fraudulent funds across the banking network. Therefore, the situation may change significantly during the investigation after an initial request for information. As such, it can be difficult to ensure that the most up-to-date and relevant information is provided to the investigators.

Moreover, owing to the rapid dispersion of funds which fraudsters often perform (with transfers between multiple accounts with multiple different banks often being completed within a few minutes), it can become increasingly difficult to provide this information to the requesting party as the situation develops. Furthermore, as the dispersion of funds extends to an increasing number of accounts (belonging to an increasing number of financial institutions) the number of different parties who require information regarding the dispersion of funds can also increase. In an example whereby an initial notification of potentially fraudulent activity is transmitted by the first device 2000, it may be that a number of second devices (such as second device 2002) also become interested in tracing the dispersion of funds as the situation develops.

For at least these reasons (and those explained in the background of the disclosure) it is desired that a method, apparatus and computer program product for reporting an exchange of messages between nodes in a network is provided.

<Apparatus>

Figure 3:
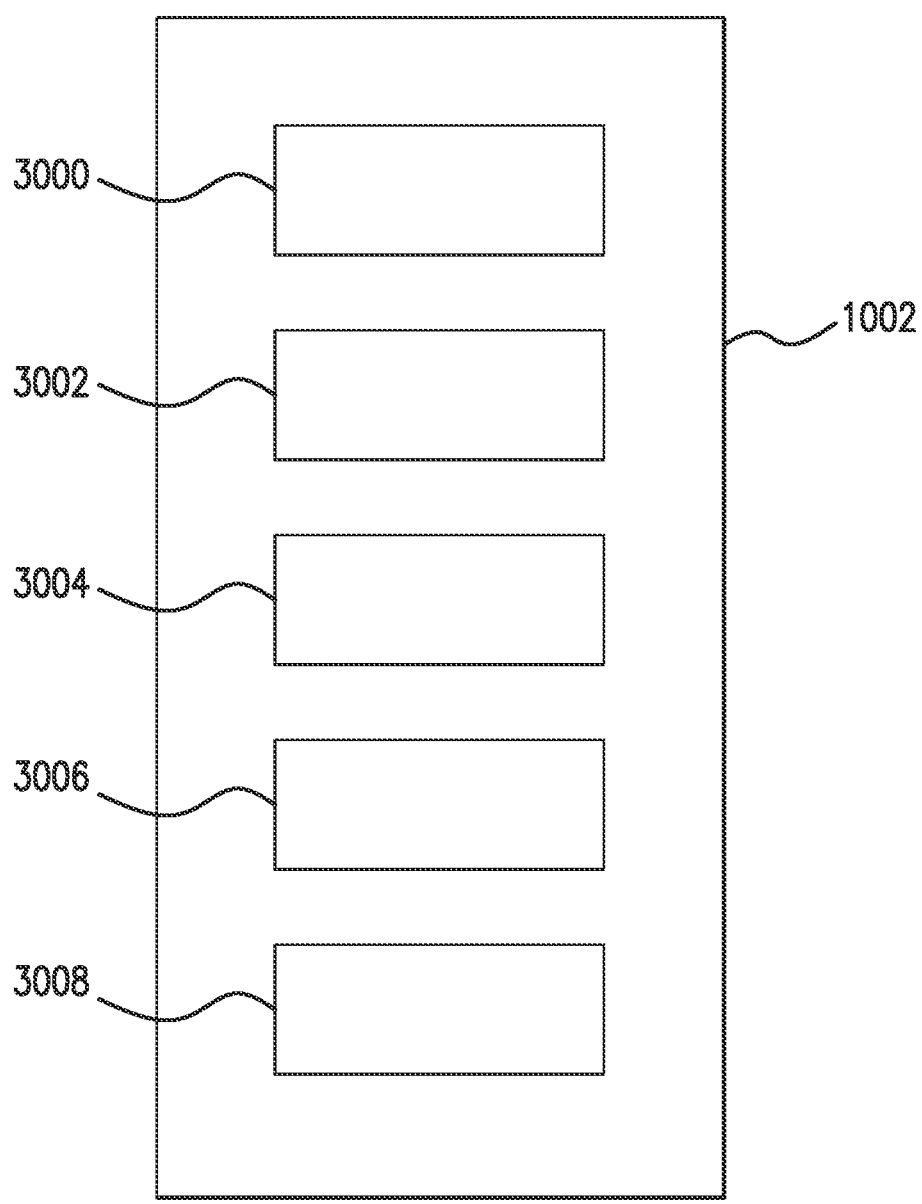
FIG. 3 illustrates an example configuration of an apparatus in accordance with embodiments of the disclosure.

Accordingly, an apparatus for reporting an exchange of messages between nodes in a network is provided as illustrated in FIG. 3 of the present disclosure.

The apparatus may be an apparatus 1000 such as that illustrated with reference to FIG. 1 of the present disclosure, where the processing circuitry 1002 of apparatus 1000 is configured to comprise a receiving unit 3000, a determining unit 3002, a building unit 3004, an identifying unit 3006 and a reporting unit 3008.

Specifically, according to embodiments of the disclosure, the receiving unit 3000 may be configured to receive, from a first device, a request for data for a target node, the data indicative of an exchange of message between nodes in a network linked to the target node. The determining unit 3002 may then be configured to determine whether a request for data for the target node has previously been received. Then, when it is determined that a request for data for the target node has previously been received, the building unit 3004 is then further configured to: build data indicative of the exchange of messages between nodes in the network lined to the target node. Once this has been built, the identifying unit 3006 is configured to identify a new portion of the data based on a comparison of the data with previous data which has been built for the target node. Finally, the reporting unit 3008 is configured to report to the first device the new portion of the data.

In this manner, the apparatus according to embodiments of the disclosure is able to reduce the overheads and volume of data which must be transmitted when reporting data regarding a target account. This improves the efficiency of the process and enables the most up-to-date relevant information to be provided to interested parties even when the number of linked accounts and/or the number of interested parties is high.

Further details regarding the method, apparatus and computer program product of the present disclosure are described with reference to FIGS. 4 to 8 of the present disclosure.

<Receiving a Request>

As explained with reference to FIG. 3 of the present disclosure, the receiving unit 3000 of apparatus 1000 of the present disclosure is configured to receive a request for data for a target node.

In examples, the request for data for a target node will be received once a particular account (an example of a type of node) or transaction (an example of a type of message) has been identified by a device (such as first device 2000) as being an account or transaction linked to potentially fraudulent activity. As such, in examples, the target account is an account which has been initially linked to potentially fraudulent activity.

Figure 4:
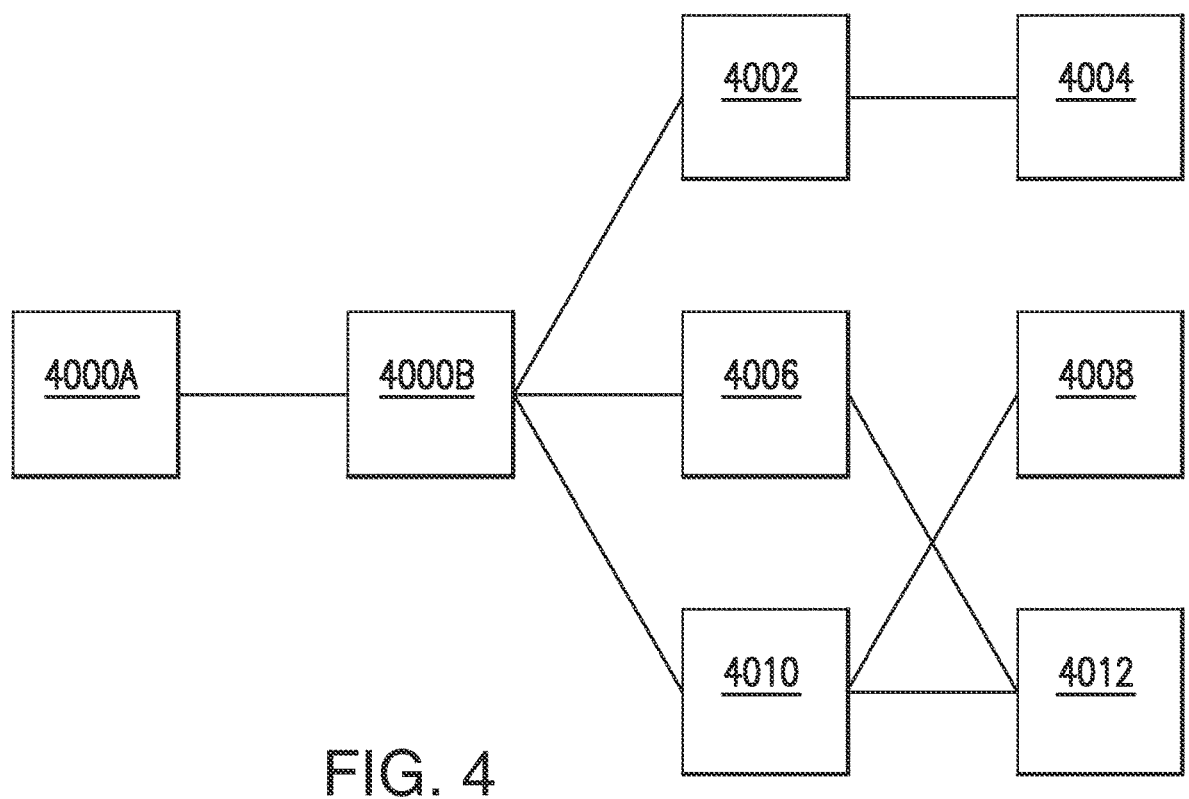
FIG. 4 illustrates an example exchange of messages according to embodiments of the disclosure.

FIG. 4 illustrates an example exchange of messages according to embodiments of the disclosure. In this example, a first network node 4000A is shown. A number of secondary nodes 4000B and 4002 to 4012 are also shown. Links between respective network nodes illustrate the exchange of messages between those network nodes. Indeed, each network node may be a particular bank account in a banking network, while each message that is exchanged may be a transaction (such as Faster Payments or the like) between those accounts.

In this example, the transaction between the first account 4000A and the second account 4000B has been identified as an initial potentially fraudulent transaction. The first account 4000A is a root node owned by a victim of the fraudulent activity. The victim has been fraudulently persuaded by the fraudsters to initiate a transaction transferring funds from the first account 4000A to the second account 4000B (which is operated by the fraudsters). Upon receiving the funds from the fraudulent transaction, the fraudster then transfers the illicit funds into a number of "second generation" accounts (being accounts 4002, 4006 and 4010 as illustrated in FIG. 4). These accounts may be accounts which are held with the same financial institution (such as the same bank) as account 4000B. However, these "second generation" accounts may also be accounts with other financial institutions in the banking network.

Once the illicit funds from the fraudulent transaction enter the "second generation" accounts 4002, 4006 and 4010, they may become mixed with legitimate funds (being funds which have not been obtained from fraudulent activity). This makes the tracing of illicit funds in the banking network more difficult. Furthermore, further transactions between accounts may then be performed by the fraudsters transferring funds from the "second generation" to a number of "third generation" accounts 4004, 4008, 4012. Typically, the fraudsters may use a number of these accounts to then retrieve small amounts of the fraudulent funds from the initial fraudulent transaction (i.e. the transaction between account 4000A and 4000B) without arousing suspicion (e.g. by withdrawing small amounts from those accounts at an ATM). However, the fraudsters may further disperse the funds from the "second generation" and "third generation" accounts to further generations of accounts.

When an entity such as a financial institution identifies that the transaction 4000A to 4000B is a potentially fraudulent transaction (e.g. when the victim of the fraud reports the transaction) the financial institution may then initiate a request identifying the account 4000B as a potentially fraudulent account (or identifying the transaction between account 4000A and 4000B as a potentially fraudulent transaction). Account 4000B therefore may be considered a target account in this example. In order to investigate the potential fraud (and attempt to recover the fraudulent funds) the institution requires information regarding the accounts and transactions which are linked to the target account. In this example, the linked accounts and transactions are therefore accounts 4002 to 4012.

However, it is important to note that not all accounts and transactions which are linked to the original victim account 4000A are linked to the target account 4000B.

Figure 5:
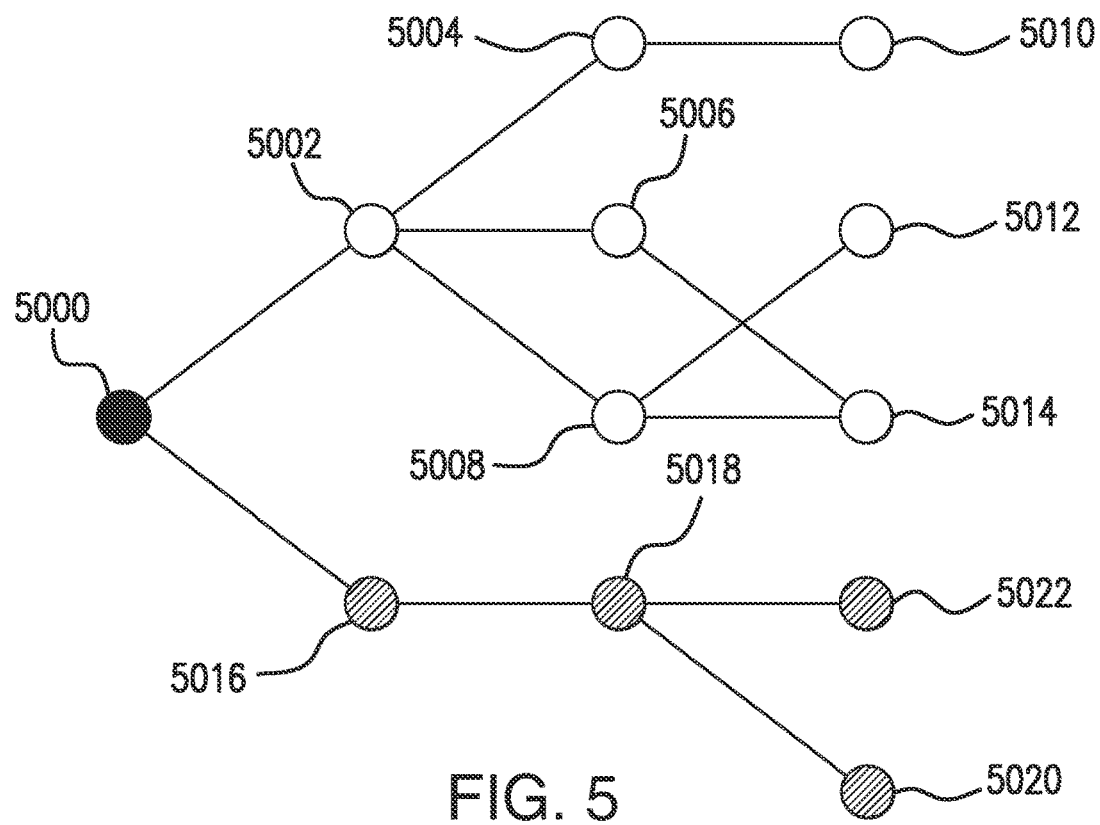
FIG. 5 illustrates an example exchange of messages according to embodiments of the disclosure.

In this regard, consider the example exchange of messages illustrated in FIG. 5 of the present disclosure.

In this example, a victim account 5000 is an account from which funds have been transferred in a fraudulent transaction to account 5002. Each of the accounts 5004 to 5014 therefore form accounts which are linked to the target account 5002. Moreover, it will be appreciated that each transaction between these accounts is a transaction which is linked to the fraudulent dispersion of funds from the target account. Indeed, while only a single connection is illustrated between these accounts (e.g. account 5002 and 5004) it will be appreciated that there may be a plurality of transactions between these accounts (e.g. a plurality of transactions between account 5002 and account 5004). Each of these transactions is also then implicated as a transaction linked to the potentially fraudulent activity.

However, in this example, a further transaction is performed from account 5000 to account 5016. This account may be a legitimate transaction which is willingly performed by the owner of account 5000. As this transaction is not linked to a transaction from the target account 5002, it is not implicated as a transaction or account linked to the potentially fraudulent activity. Moreover, any further transactions such as the transactions between account 5016 and accounts 5018, 5020 and 5022 are not linked to the potentially fraudulent activity. In other words, accounts 5016 to 5022 (and the transactions between those accounts) do not belong to the same dispersion tree as the accounts 5002 to 5014 (and the transactions between those accounts). Nevertheless, should the account 5016 later be identified as a target account (being an account which is linked to potentially fraudulent activity, for example) then accounts 5018 to 5022 (and the transactions between those accounts) should be reported. In other words, the accounts 5002 to 5014 belong to a first dispersion tree while the accounts 5016 to 5022 belong to a second dispersion tree. Each of these individual dispersion trees can be analysed and investigated independently.

Of course, it will be appreciated that the present disclosure is not particularly limited to the number of accounts, transactions and dispersion trees illustrated in the examples of FIGS. 4 and 5 of the present disclosure. Rather, the numbers of the accounts, transactions and dispersion trees may be very different (and significantly larger) than those numbers illustrated in these specific examples.

Now, returning to the example of FIG. 2 of the present disclosure, it will be understood that a request for data for a target node may be transmitted by a device such as the first device 2000 to apparatus 1000. However, it will be understood that the apparatus which consumes the stream of transactions within the banking network (storing details of the transactions in a storage such as storage 2006; i.e. server 1000A) need not be the same apparatus which receives the request for data for the target node (i.e. apparatus 1000). That is, it will be understood that a first apparatus (such as server 1000A) The may consume the stream of transactions in the banking network in order to build a set of traceable transactions which are stored in the storage 2006, while a separate apparatus 1000 according to embodiments of the disclosure may receive the request for data for a target node or account. Indeed, the server 1000A may build the set of traceable transactions in accordance with a method such as that described in published patent applications EP3629273A1 and EP362955A1. However, the set of traceable transactions may be built using any other suitable method as desired and the present disclosure is not particularly limited in this regard. In fact, it will be appreciated that the apparatus 1000 of the present disclosure may be used to report an exchange of messages in the banking network independently of the method which has been used in order to construct the set of traceable messages. As such, the present disclosure is not particularly limited in this regard, provided that the apparatus 1000 can access the set of traceable messages which has been recorded.

Furthermore, the request for data for a target node is not particularly limited in accordance with embodiments of the disclosure, provided that the request is made for data indicative of an exchange of messages between nodes in a network linked to the target node. In some examples, the request may identify the target node (such as a unique identifier of that node). In other examples, the request may comprise an identifier of a transaction linked to that target node (such as a unique identifier of the transaction). In other examples, the request may comprise an identifier of a set of transactions linked to that target node (such as a unique dispersion tree identifier of transactions and accounts which are known to be linked to the target account).

The request may be received by the apparatus of embodiments of the present disclosure by any suitable method. In some examples, the request may be received by circuitry such as network connection 1008 of the present disclosure. The request may be received over a communication network such as the internet (e.g. a communication network such as 2004 illustrated in FIG. 1 of the present disclosure). In other examples, the request may be received over a secure connection between the device and the apparatus 1000. Moreover, it will be appreciated that the request need not be made by the financial institution who operates the target account. That is, any entity with the requisite permissions and authority may initiate a request for data for the target node in accordance with embodiments of the disclosure (e.g. the second device 2002 may initiate a request for a target account held by the first device 2000). Furthermore, the request for data for the target node may be received at any time. That is, for example, the request may be received immediately following the identification of the target node as being linked to potentially fraudulent activity. Alternatively, the request may be received a certain time after the identification has been made.

In this manner, the apparatus for reporting an exchange of messages between nodes in the network receives a request for data for a target node, the data indicative of an exchange of messages between nodes in a network linked to the target node.

<Previous Request>

As explained above, once a request has been received, the determining unit 3004 of apparatus 1000 according to embodiments of the disclosure is further configured to determine whether a request for data for the target node has previously been received.

It will be appreciated that there are a number of mechanisms by which the apparatus 1000 according to embodiments of the disclosure may determine whether a request has previously been received for data for the target node. Indeed, the manner by which it is determined whether a previous request for the target node has been received will depend, at least in part, of the form of the request itself.

Consider an example whereby the first device 2000 illustrated in FIG. 2 of the present disclosure sends a request for data of a target node (such as node 5002 illustrated in FIG. 5 of the present disclosure) to the apparatus 1000 according to embodiments of the disclosure for example. As previously explained, this request may comprise information such as a unique identifier of that target node. Upon receiving the request, the apparatus 1000 may then compare the unique identifier of the target node against a lookup table of target nodes which have been the subject of previous requests. If a match is found in this lookup table, then it will be known that a previous request for data for the target node has been made. However, if no match is found, then it will be known that this is a new request being a request for data for a target node which has not previously been made. In this specific example, the lookup table may be stored in a storage unit which is accessible to the apparatus 1000. This storage unit may be either internal or external to the apparatus 1000. Of course, the present disclosure is not particularly limited to the use of a lookup table to retrieve information regarding previous requests from the storage unit. Other methods to retrieve the data from the storage unit may be used in accordance with the present disclosure as required.

The data which is stored in the storage unit regarding previous requests may include certain additional information beyond that of the identifier of a target node. For example, the storage unit may also record information regarding identifiers of transactions linked to that target node (such as a unique identifier of the transaction) and/or an identifier of a set of transactions linked to that target node (such as a unique dispersion tree identifier of transactions and accounts which are known to be linked to the target account). Moreover, information regarding the number of previous requests, the date and time of previous requests and/or the devices from which that request was made may also be recorded within this storage unit. Further details regarding this data table will be described with reference to FIG. 7 of the present disclosure.

In this example, when a request is received, data regarding that request may then be stored in the storage unit by apparatus 1000. Accordingly, this data will be available to be retrieved when any subsequent requests are made. However, in other examples, an external device (such as the requesting device itself) The may add a record of the request to the storage unit which is accessible to the apparatus 1000.

As such, in some examples, the determination as to whether there has been a previous request can be made based on a comparison of the request with additional information recorded in a storage unit.

However, in some examples, the determination as to whether a previous request has been made may be made without use of a storage unit. That is, while, in some example, the determination as to whether a request for data for a target node has been previously received is made with reference to a record of the previous requests (such as a lookup table recorded in a storage unit), the present disclosure is not particularly limited in this regard. In fact, in some examples, the determination may be made with respect to the request itself. That is, in some examples, the request which is received may itself contain information indicating whether a previous request for that target node has been made by the requesting device. The apparatus according to embodiments of the disclosure may then parse the request in order to identify whether the request comprises information indicating that a previous request has been made. If such information is identified, it can be determined that a previous request has been made.

As such, in some examples, the determination as to whether a previous request has been received can be made based on an analysis of the request which has been received itself. This is particularly advantageous as it reduces the storage requirements of apparatus 1000.

Furthermore, in some examples, the determination as to whether there has been a previous request for data for a target node can be made with respect to information regarding both the target node and the device from which that request has been received. That is, in some examples, the apparatus can determine whether a previous request for information regarding the target node has been made by that specific device which initiated the request.

Consider, for example, an example situation illustrated with reference to FIG. 2 of the disclosure. In this example situation, a first device 2000 has previously sent a request for information regarding a target node (such as target node 5002) to the apparatus 1000. As such, when any further requests for such information regarding target node 5002 are sent to apparatus 1000 by the first device 2000, the apparatus 1000 will determine that a previous request has been made. However, in some examples, if device 2002 then sends a request for information regarding target node 5002 to apparatus 1000, apparatus 1000 may determine that while a previous request for information regarding target node 5002 has been made by device 2000, no such previous request has been made by device 2002. As such, in this example, the apparatus would then determine that no previous request has been made based on the request received from apparatus 2002. This may be particularly advantageous as it will ensure that the first request from each device regarding a specific node will be identified as an initial request for that data for that device. Therefore, as is described in more detail below, each device may receive full information regarding the target node when that device issues its initial request to apparatus 1000.

In this manner, the apparatus according to present disclosure is configured to determine whether a previous request for data for the target node has been received.

<Reporting the New Portion of the Data>

When it is determined that a request for data for the target node has previously been received, the apparatus according to embodiments of the disclosure will take necessary steps in order to identify and report the new portion of the data since the previous request has been made. This ensures that only the most up-to-date and relevant information is reported, reducing the overheads of communication and the volume of information which must be reported. In other words, since a device has previously requested data for a target node, it will be understood that it is not required to provide that device with information regarding the target node which that target node has previously received. Rather, only the most up-to-date and relevant information should be reported to that device.

Now, once it has been determined by the determining unit 3002 that a request has previously been received, the building unit 3004 is configured to build information regarding the target node. This information comprises data indicative of the exchange of messages between nodes in the network linked to the target node. The manner of building the data will depend, in part, on the type and form of data which has been recorded for the transactions.

Consider, for example, a situation whereby a set of traceable messages is constructed as the transactions occur following the method described in published patent applications EP3629273A1 and EP362955A1. In this example, as each transaction within the banking networking is conducted, information regarding that transaction is identified and recorded such that a set of traceable messages is produced in real time. However, the set of traceable messages is only used in order to construct a dispersion tree (indicating the exchange of messages between nodes in the network linked to the target node) when a request for information regarding the target node is received. That is, when an account, or transaction is reported as being linked with fraudulent activity, the set of traceable messages is then accessed by apparatus 1000 of the present disclosure in order to build the information which has been requested (i.e. being information regarding transactions and accounts which are linked to the target account). As such, each dispersion tree for a set of transactions linked to a target node is only constructed by the building apparatus from the set of traceable messages once a request for data for the target node is received.

However, while in this example, the building unit 3004 builds information regarding the target node from the set of traceable messages which has been produced following the method described in published patent applications EP3629273A1 and EP362955A1, it will be appreciated that the present disclosure is not particularly limited in this regard. That is, any suitable method may be used in order to record build information regarding the target node as required depending upon the method which has been used in order to record the original transactions as they occur. Accordingly, the present disclosure is not particularly limited in this regard.

Figure 6A:
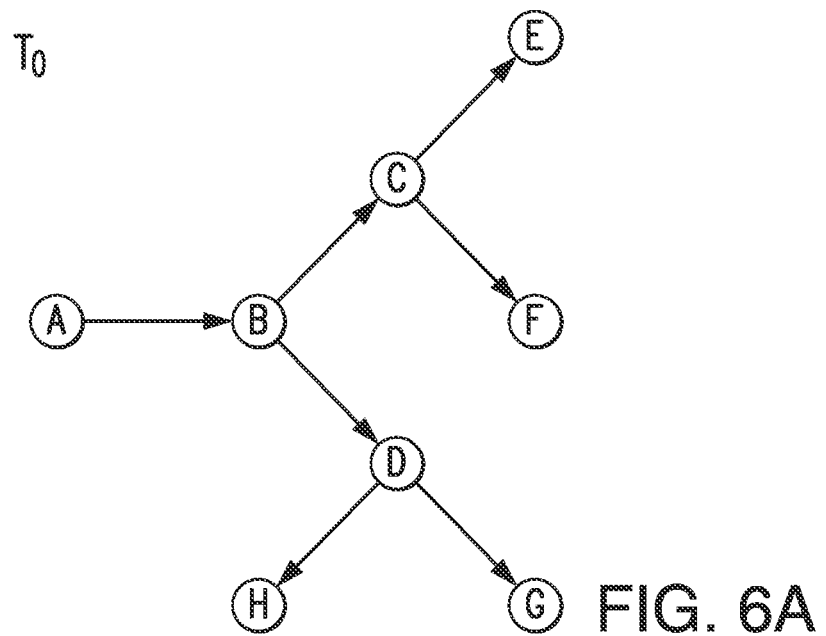
FIG. 6A illustrates an example exchange of messages in accordance with embodiments of the disclosure.

Consider the example exchange of messages in accordance with embodiments of the disclosure illustrated in FIG. 6A of the present disclosure. This exchange of messages illustrates information which may be built by the building unit 3004 in accordance with embodiments of the disclosure when a request for information is received. The exchange of messages illustrated in FIG. 6A of the present disclosure has been built at a time T0.

Specifically, in this example, apparatus 1000 has received a request for data for the target node A from a first device (such as first device 2000 described with reference to FIG. 2 of the present disclosure) at a time T0. In order to build the information regarding the exchange of messages which are linked to this target node A, the building unit 3004 of apparatus 1000 uses information contained in the request message (such as the unique account identifier or dispersion tree identifier) in order to access and retrieve information from a database comprising information regarding all the previous messages which have been exchanged in the network. Only information regarding nodes and messages which have been identified and recorded as being linked to the target node will be accessed and retrieved by the building unit 3004. That is, information regarding messages and nodes which are not linked to the target node will not be accessed and retrieved by the building unit 3004. Indeed, the information retrieved and collated by the building unit 3004 in response to the request may be a small portion of the total number of messages which have been exchanged in the network itself. Once this information has been collated, the building unit 3004 according to embodiments of the present disclosure will then construct information (such as a dispersion tree) illustrating and describing the transfer and exchange of messages across the network which are linked to the target account A.

In the example of FIG. 6A, the information which is retrieved and built by the building unit 3004 shows that the target node A (for which the request has been received) exchanged a message with node B. Then, node B exchanged messages with nodes C and D. Node C subsequently exchanged further messages with nodes E and F. However, node D subsequently exchanged messages with nodes H and G. No further messages and no further nodes are identified as being linked to the target node A at time T0 in this example. As such, at time T0, the information visually illustrated in FIG. 6A of the present disclosure represents the data indicative of the exchange of messages between nodes in the network linked to the target node. Of course, as explained above, other nodes than those illustrated in the example of FIG. 6A will exist in the network and other messages will have been exchanged within the network. However, those other nodes and other messages are not, at time T0, linked to the target node A. Accordingly, they will not be included in the data built by the building unit 3004 following the initial request at time T0.

Consider now that, at a time T1 (being a time subsequent to the time T0 described with reference to FIG. 6A), a further request is received from device 2000 for data for the target node A. This subsequent request may be received at a later stage of investigations into potentially fraudulent activity regarding the target node A, for example.

Figure 6B:
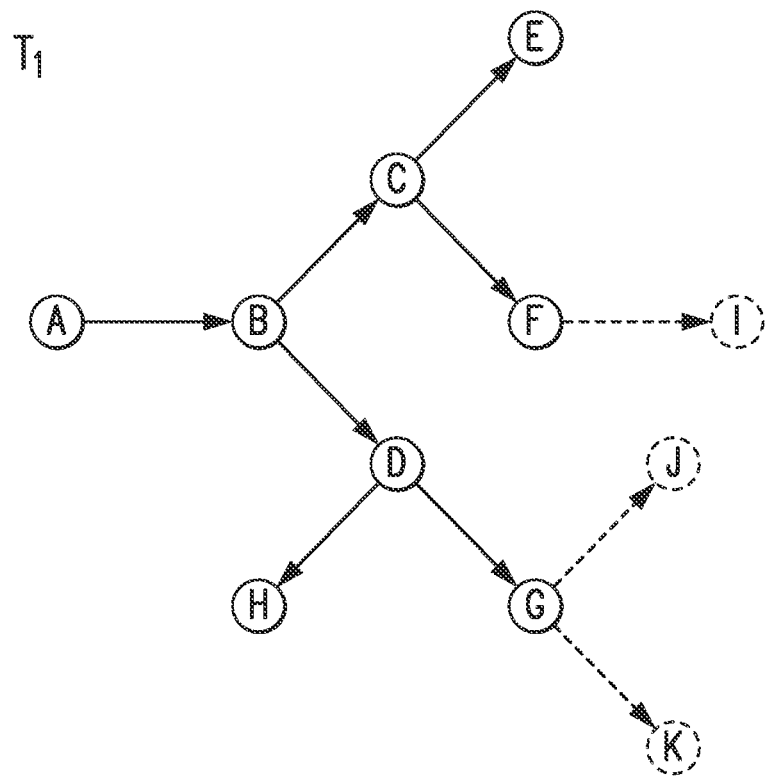
FIG. 6B illustrates an example exchange of messages in accordance with embodiments of the disclosure.

FIG. 6B shows the nodes and messages which are linked to the target node A at time T1. That is, the exchange of messages illustrated in FIG. 6B indicates the information which is retrieved and built by the building unit 3004 when the subsequent request for data for the target node A is received at time T1.

As described with reference to FIG. 6A of the present disclosure, the target node A has been identified as being linked to nodes B, C, D, E, F, G and H through an exchange of messages. That is, this portion of the data is the same as the data built by the building unit 3004 at time T0, as once a node has been linked to another node through an exchange of messages, that link remains (at least, predetermined period of time and/or that link is actively removed (i.e. when it is determined that the link has been recorded between the nodes in error)). However, at time T1, the nodes I, J and K have also been recorded as being linked to the target node A. This is because node F has undergone an exchange of messages with node I since time T0, while node G has undergone an exchange of message with nodes J and K since time T0. Accordingly, the nodes I, J and K (and the messages which have been exchanged with nodes F and G) are built by the building unit 3004 into the data indicative of the exchange of messages linked to the target node A.

As such, at time T1, the information visually illustrated in FIG. 6B of the present disclosure represents the data indicative of the exchange of messages between nodes in the network linked to the target node A.

At this stage, when it has been determined that a previous request for data for the target node has been received, the identifying unit 3006 of the present disclosure is configured to identify a new portion of the data based on a comparison of the data with previous data which has been built for the target node.

As previously described, the data illustrated in FIG. 6A illustrates the data built by the building unit 3004 at a time T0 (when an initial request for the data for the target node A is received) while the data illustrated in FIG. 6B illustrates the data built by the building unit 3004 at a time T1 (when a subsequent request for data for the target node A is received). Since a previous request for the data has been made, the identifying unit 3006 of the present disclosure is configured to identify the changes to the data which have occurred since the initial request for data at time T0 and the most recent request for data at time T1. These changes are identified as the new portion of the data. As such, in the example of FIGS. 6A and 6B, the nodes I, J and K (and the messages they have exchanged with nodes F and G) are identified as the new portion of the data at time T1 by identifying unit 3006.

In some examples, the identifying unit 3006 may identify the new portion of the data based on a comparison of the data built by the building unit 3004 at the time when the most recent request is received compared to the data built by the building unit 3004 at the time when the initial request is received. However, in other examples, the new portion of the data is identified based on a comparison of the data built by the building unit 3004 at the time when the previous request (being the request immediately preceding the most recent request) is received with the data built by the building unit 3004. Therefore, if a further request was received at a time T2 (being a time after time T1) only the changes since time T1 would be identified as being the new portion of the data at time T2 by the identifying unit 3006 in this situation.

Furthermore, in other examples, the comparison may be made with any previous request which is identified in the request message. That is, in examples, the requesting device may, at time T2, be able to specify within the request message itself whether apparatus 1000 should identify the new portion of the data using a comparison with the data built at T0 or T1. This improves the flexibility to identify the most relevant portion of the data as requested by the receiving unit. Such flexibility may further reduce the number of requests which need to be submitted by the first device 2000 and thus further reduces the volume of information which must be transmitted over the network. In fact, in some situations, the requesting apparatus may request that all data should be retransmitted.

In some examples, the identifying unit 3006 may be configured to identify the new portion of the data based on a direct comparison of the data built at a previous time with the data built when the new request is received. In this regard, the apparatus 1000 may be configured to record a version of the data built when each request is received in a storage unit, such that it can be compared to the data built when any later request is made. In some examples, only the most recent version of the data for each target node is recorded in the storage unit. That is, when any further request is made, the apparatus may replace the version of that data which is currently stored in the storage unit in order to store the most recent version of the data indicative of the exchange of messages between nodes in the network linked to the target node. This reduces the storage requirements for the data, which is particularly advantageous when a large number of requests for data are received.

In fact, in some examples, when the new data has been identified, the apparatus 1000 may be configured to append the new data to the version of the data which is currently stored in the storage (or augment the data currently held in the storage with the new data). This provides an efficient mechanism for replacing the data which is currently held in the storage as only the new portion of the data needs to be recorded.

In other examples, the identifying unit 3006 may be configured to identify the new portion of the data without a direct comparison with the data which was built at the time of the previous request. That is, in some examples, once the building unit 3004 has built the data, the identifying unit 3006 may be configured to identify the new portion of the data based upon a comparison of the data built by the building unit 3004 with the time information of the previous request. Consider the examples of FIGS. 6A and 6B for example. Here, when a subsequent request is received at time T1 (as illustrated in FIG. 6B) the identifying unit 3006 may be configured to identify the new portion of the data (being the changes since the previous request) based on a comparison of the data built by the building unit 3004 at time T1 with the time of the previous request T0. Specifically, the identification unit 3006 may be configured to identify that any linked nodes linked by an exchange of messages which occurred before the time of the previous request (i.e. before time T0) will have been included in the data built by the building unit 3004 at time T0. Only changes (i.e. new linked nodes) owing to an exchange of messages which has occurred after the time T0 will form the new portion of the data at time T1. Therefore, if time information regarding the exchange of messages between nodes F and I show that the exchange of messages occurred after time T0, the identification unit can determine that, at time T1, the node I and the exchange of messages between node F and node I will form a portion of the new data at time T1. Identifying the new portion of the data in this manner (without a direct comparison with the data built at the time of the previous request) provides a particularly efficient mechanism for identifying the new portion of the data as it is not required to store or reconstruct the data of a previous request (such as the most recent previous request for the data).

Indeed, the present disclosure is not particularly limited to these examples of identifying the new portion of the data. Rather, any method may be used in order to identify the new portion of the data as required depending on the situation to which the embodiments of the disclosure are applied.

Moreover, while, in the above described examples, the new portion of the data describes new nodes which have been identified as being linked to the target node since the time of the previous request, it will be appreciated that the present disclosure is not limited in this regard. That is, the new data may describe a new exchange of messages which has not previously been identified in the previous data built by building unit 3004 at the time of the previous request. Consider an example situation where a further request for data linked to node A is made by the first device 2000 at a time T2 (being a time after time T1 described with reference to FIG. 6B of the present disclosure). In this example, when the building unit 3004 builds the data indicative of the exchange of messages at time T2 linked to the target node A, the identifying unit 3006 identifies that no new nodes are associated with the target node A since the time of the previous request (time T1). That is, even at the subsequent time T2, only the nodes B to K are identified as being linked to the target node A (the same as were linked to the target node at the time of the previous request T1 as illustrated in FIG. 6B of the present disclosure). However, the identifying unit 3006 may identify that an additional exchange of messages has been made between certain nodes which were already part of the data (such as an additional exchange of messages between node B and D, or an additional exchange of messages between nodes B and H, for example). Accordingly, at time T2, the identifying unit 3006 will identify the additional exchange of messages between these nodes as being part of the new data. Therefore, even in the situation where no additional nodes have been identified as being linked to the target node A, the requesting device (device 2000 in this example) can receive the most relevant and up-to-date information at the time the request is made.

Furthermore, in some examples, when the building unit 3004 builds the data, the identifying unit 3006 may identify that no changes have occurred since the time of the most recent previous request. That is, the identifying unit 3006 may determine that there neither any new nodes nor any new messages have been added to the data since the most recent previous request. In this case, the identifying unit 3006 may generate data indicative of the fact that there is no new data. By providing information indicating that there is no new data in this manner, the requesting party can understand that the information they possess is the most relevant and up-to-date version of the data for the target node.

Once the identifying unit 3006 has identified the new portion of the data, that new portion of the data may be passed to the reporting unit 3008 such that it can be reported to the first device 2000. Accordingly, the reporting unit 3008 of the apparatus 1000 according to the present disclosure is configured to report, to the first device, by the circuitry, the new portion of the data.

In some examples, the reporting unit 3008 may report the new data to the requesting device in the manner in which the request for the data was made. Consider the example situation described with reference to FIG. 2 of the present disclosure. Here, the first device 2000 made the request for data for the target node to apparatus 1000 over the communication network 2004. Accordingly, when reporting the new data to the first device, the apparatus 1000 may transmit the new data over the same communication network 2004. In this manner, the new data can be securely transmitted to the requesting device. Indeed, in some example, the reporting unit 3008 may be circuitry such as the network connection 1008 described with reference to FIG. 1 of the present disclosure. However, in other examples, the reporting unit may be configured to instruct an external network connection and/or transmitting unit to communicate the new data to the requesting device. Therefore, the network connection and/or transmitting unit need not be part of the apparatus 1000 in accordance with certain examples, provided that the reporting unit of apparatus 1000 can control the reporting of the new data to the requesting device.

Moreover, in some examples, the reporting unit 3008 may be configured to perform certain processing on the new data prior to reporting that new data to the requesting device. That is, when obtaining the new data from the identifying unit 3006, the reporting unit 3008 may apply certain processing to the new data in order to control the type of data which is reported to the requesting device. In some examples, this may include encrypting the new data such that the new data can be securely transmitted to the requesting device. In other examples, this processing may include processing the new data in order to standardise the format and/or data structure of the new data such that it is provided in a form which can readily be accessed or utilized by the requesting device (or an operator operating the requesting device). Of course, it will be appreciated that the specific nature of the standardised data format is not particularly limited, and may vary depending on the situation. However, by ensuring that the new data is reported to the requesting device in a standardised data format which is readily accessible to the requesting device, the efficiency of the provision of the new data to the requesting device can be improved.

Furthermore, while in the above described examples, the new data is reported only to the requesting device, it will be appreciated that the present disclosure is not particularly limited in this regard. Indeed, the reporting unit 3008 may be configured to report the new data to a plurality of different devices as required.

Consider, again, the example illustrated in FIG. 2 of the present disclosure. Here, in this example, a first device has made an initial request for data for a target node (such as node 5002 described with reference to FIG. 5 of the present disclosure). Once the data has been built by building unit 3004 and the new portion of the data has been identified by identifying unit 3006, the reporting unit 3008 reports the new portion of the data to the first device.

Then, at a time after the time of the initial request, the second device makes a subsequent request for data for the target node (being the same target node as requested in the earlier request by the first device). Accordingly, the apparatus 1000 can identify that a previous request for this data has been made by the first device for data for that target node. As such, once the building unit 3004 has built the data for the target node, the reporting unit 3008 is configured to report the new portion of the data to the first device. However, the reporting unit 3008 provides the full data to the second device since the second device, itself, has not made a previous request for that data (and, as such, the second device would not have access to the original portion of the data which was provided based on the initial request). In this manner, both the first device and second device receive the most relevant and up-to-date information for the target node whenever a request for the target node is made on the network. This is particularly advantageous, since the operator of the first device can know that they have the most up-to-date and relevant information on the target node even if the subsequent request for data was made by another, separate, device on the network (such as the second device in this example).

Figure 7:
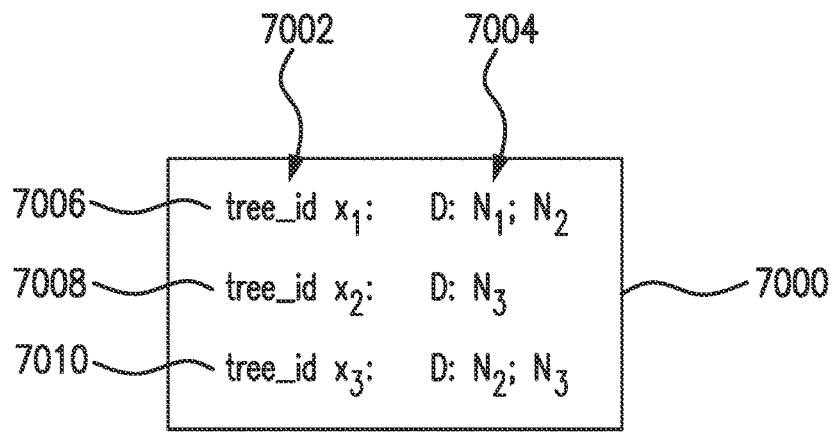
FIG. 7 illustrates an example data table in accordance with embodiments of the disclosure.

Consider the example data table which is illustrated in FIG. 7. The data table 7000 is an example of a data table which may be produced and stored by the apparatus 1000 according to embodiments of the disclosure. The data table may be updated each time that a request for data is received.

The first column 7002 stores information regarding a target node for which data of linked nodes has been previously received. That is, in some examples, the first column may store a unique identifier for each node for which a request for data has been received. In other examples, such as when the set of messages is produced in accordance with the method described in published patent applications EP3629273A1 and EP362955A1, the first column may store information such as a unique identifier of the collection of linked accounts (e.g. a unique dispersion tree identifier or the like). This first column can be used to lookup values in the second column when a request for a target node is received and when that target node has previously been requested (and thus has an entry in the data table). Furthermore, the second column 7004 in data table 7000 can contain information indicating which device, or devices, have made requests with regard to the target node identified in the first column 7002.

That is, in the first column 7006 of the example data table 7000, devices N1 and N2 have made requests regarding the dispersion tree identified by tree_id X1. Therefore, when a further request for data regarding the dispersion tree identified by tree_id X1 is made, the new portion of data since the time of the previous request will be reported to devices N1 and N2. However, if a further request is made for data regarding the dispersion tree identified by tree_id X2, only the device N3 will be notified of the new portion of the data (as it is the only device which has made a previous request for this data). Moreover, if a request is made by a device which is not listed in the second column 7004, then that requesting device will receive a full version of the data. That is, for example, if device N1 makes a request for data regarding the dispersion tree identified by tree_id X3, device N1 will receive a full version of the data which has been built by building unit 3004, since device N1 is not currently listed as a device which has previously made a request for that data in column 7004 and row 7010.

Indeed, reporting the new data in the standardised data format may be particularly advantageous when reporting the new data to a number of different devices, since the information which is transmitted may be readily accessible to each of the devices which is interested in the data.

Moreover, when it is determined by the determining unit 3002 that a previous request for data for the target node has not been received, the building unit 3004 may be configured to build data indicative of the exchange of messages between nodes in the network linked to the target node. Then, the reporting device 3008 may report (to the requesting device) the data indicative of the exchange of messages between nodes in the network. Therefore, even when a request for the data for the target node has not been previously received, the requesting node can obtain information regarding the exchange of messages between nodes in the network linked to the target node. However, if a further request for that data is made, the device will then receive the new portion of the data indicative of the exchange of messages between nodes in the network linked to the target node (as it already has access to the original portion of the data received with the initial request). This improves the efficiency of communication and reduces network overheads and traffic.

Therefore, in some optional examples, it will be appreciated that the reporting device 3008 may be further configured to identify one or more second devices which have previously made a request for data for the target node (when that request has been made by a first device); and report, to the one or more second devices, the new portion of the data.

Of course, the present disclosure is not particularly limited to the form and type of data which is illustrated in the example data table of FIG. 7 of the present disclosure.

<Advantageous Technical Effects>

Therefore, an apparatus for reporting an exchange of messages between nodes in the network in accordance with embodiments of the disclosure has been described. The apparatus according to embodiments of the disclosure is able to reduce the overheads and volume of data which must be transmitted when reporting data regarding a target node (or target account). This improves the efficiency of the process and enable the most up-to-date relevant information to be provided to interested parties even when the number messages (or transactions), the number of linked nodes (or accounts) and/or the number of interested parties (or devices) is high.

In a situation such as that described in the background of the present disclosure, an interested party (such as an investigator) is able to make repeated requests for data for an account suspected of fraudulent activity over the course of an investigation in order to ensure that the most relevant and up-to-date information regarding accounts which are linked to the potentially fraudulent account is obtained without significantly increasing the communication overheads and network traffic. This improves the efficiency of communication and ensures that transactions which are associated with the fraudulent activity can be readily identified, such that money can be stopped leaving those accounts and, ultimately, those accounts can be closed.

Of course, the present disclosure is not particularly limited to these advantageous technical effects. Other effects will become apparent to the skilled person when reading the present disclosure.

Furthermore, a method of reporting an exchange of messages between nodes in a network is provided by the present disclosure.

<Method>

Figure 8:
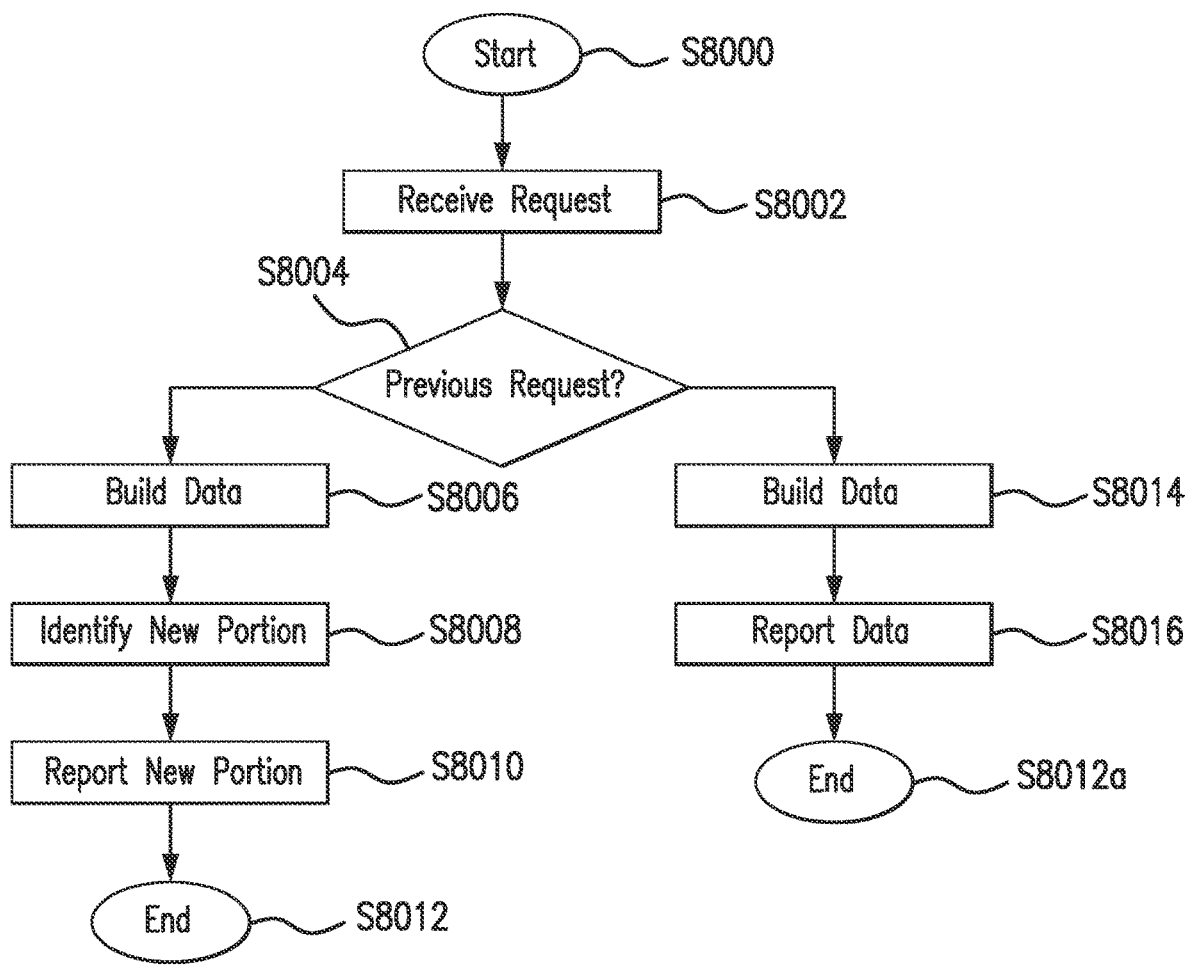
FIG. 8 illustrates an example method according to embodiments of the disclosure.

Referring now to FIG. 8, an example method of reporting an exchange of messages between nodes in a network is illustrated. The method may be performed by an apparatus such as apparatus 1000 described with reference to FIGS. 1 and 3 of the present disclosure.

The method starts at step S8000.

In step S8002, the method comprises receiving from a first device, using circuitry, a request for data for a target node, the data indicative of an exchange of messages between nodes in a network linked to the target node.

Once the request has been received, the method proceeds to step S8004.

In step S8004, the method comprises determining, by the circuitry, whether a request for data for the target node has previously been received.

When a request for data for the target node has previously been received, the method proceeds to step S8006.

In step S8006, the method comprises building, by the circuitry, data indicative of the exchange of message between nodes in the network linked to the target node. This may, in examples, comprise building a set of traceable messages through a network of nodes as described in EP3629273A1 and EP362955A1. However, in other examples, this may comprise retrieving and compiling data linked the target node from an external database or the like.

Once the data has been built, the method proceeds to step S8008.

In step S8008, the method comprises identifying, by the circuitry, a new portion of the data based on a comparison of the data with previous data which has been built for the target node. In examples, this comparison may be made with respect to previous data stored in a storage. However, in other examples, this comparison may be made with respect to an analysis of the date of certain exchanges within the data with the date of the request, for example.

Then, once the new portion of the data has been identified, the method proceeds to step S8010.

In step S8010, the method comprises reporting to the first device, by the circuitry, the new portion of the data.

The method then proceeds to, and ends with, step S8012.

According to this example method, it is possible to reduce the overheads and volume of data which must be transmitted when reporting data regarding a target account. This improves the efficiency of the process and enable the most up-to-date relevant information to be provided to interested parties even when the number of linked accounts and/or the number of interested parties is high.

Returning now to step S8004, when it is determined that a previous request for the target node has previously been received, the method according to embodiments of the disclosure may, optionally, proceed to step S8014.

In step S8014, the method comprises building, by, data indicative of the exchange of messages between nodes in the network linked to the target node.

Then, once the data has been built, the method proceeds to step S8016.

In step S8016, the method comprises reporting to the first device, by the circuitry, the data indicative of the exchange of messages between nodes in the network.

The method then proceeds to, and ends with, step S8012a.

In this manner, even when a new request is received (being a request for a new target account or a request from a new interested party, for example) it is possible that the relevant data can be efficiently reported. Moreover, when further requests are received, the new portion of the data will be identified and reported to that party. Accordingly, this ensures that only the most up-to-date and relevant information will be reported in subsequent requests.

It will be appreciated that embodiments of the present disclosure may further be arranged in accordance with the following numbered clauses:

1. A method of reporting an exchange of messages between nodes in a network, the method comprising:
   receiving from a first device, using circuitry, a request for data for a target node, the data indicative of an exchange of messages between nodes in a network linked to the target node;
   determining, by the circuitry, whether a request for data for the target node has previously been received;
   and, when a request for data for the target node has previously been received, the method comprises:
   building, by the circuitry, data indicative of the exchange of messages between nodes in the network linked to the target node;

identifying, by the circuitry, a new portion of the data based on a comparison of the data with previous data which has been built for the target node; and reporting to the first device, by the circuitry, the new portion of the data.

2. The method according to Clause 1, wherein the data indicative of the exchange of messages includes information regarding the source node, the target node and a message value for each exchange.

3. The method according to Clause 1 or 2, wherein the request for data comprises information identifying the target node.

4. The method according to any preceding Clause, wherein the request comprises an identifier identifying an exchange of messages linked to the target node.

5. The method according to any preceding Clause, wherein the target node is an account in a banking network and wherein the messages include transactions between the accounts.

6. The method according to any preceding Clause, wherein the method comprises replacing the previous data which has been built for the target node with the data indicative of the exchange of messages between nodes in the network linked to the target node.

7. The method according to any preceding Clause, wherein replacing the previous data which has been built for the target node includes augmenting the previous data with the new portion of the data.

8. The method according to any preceding Clause, wherein when a request for data for the target node has not previously been received, the method comprises:

building, by the circuitry, data indicative of the exchange of messages between nodes in the network linked to the target node;

reporting to the first device, by the circuitry, the data indicative of the exchange of messages between nodes in the network; and storing, in a first storage, by the circuitry, the data indicative of the exchange of messages between nodes in the network.

9. The method according to any preceding Clause, wherein the data indicative of an exchange of messages between nodes in a network linked to the target nodes is a dispersion tree showing the dispersion of messages through the network linked to the target node.

10. The method according to any preceding Clause, wherein the new portion of the data indicative of the exchange of messages between nodes in the network linked to the target node includes information identifying new nodes and new messages which were not previously identified as being linked with the target node.

11. The method according to any preceding Clause, wherein the method comprises identifying one or more second devices which have previously made a request for data for the target node; and reporting, to the one or more second devices, by the circuitry, the new portion of the data.

12. The method according to any preceding Clause, wherein the method further comprises formulating the new portion of the data into a standardised data structure; and reporting the new portion of the data in the standardised data structure.

13. The method according to any preceding Clause, wherein the request includes an identifier of the first device; and wherein determining whether a request for the request for data for the target node has previously been received includes determining whether a request for data for the target node has previously been received from the first device.

14. An apparatus for reporting an exchange of messages between nodes in a network, the apparatus comprising circuitry configured to:

receive from a first device a request for data for a target node, the data indicative of an exchange of messages between nodes in a network linked to the target node;

determine whether a request for data for the target node has previously been received;

and, when a request for data for the target node has previously been received, the circuitry is further configured to:

build data indicative of the exchange of messages between nodes in the network linked to the target node;

identify a new portion of the data based on a comparison of the data with previous data which has been built for the target node; and report to the first device the new portion of the data.

15. A computer program product comprising instructions which, when the instructions are implemented by a computer, cause the computer to perform a method of reporting an exchange of messages between nodes in a network, the method comprising:

receiving from a first device a request for data for a target node, the data indicative of an exchange of messages between nodes in a network linked to the target node;

determining whether a request for data for the target node has previously been received; and, when a request for data for the target node has previously been received, the method comprises:

building data indicative of the exchange of messages between nodes in the network linked to the target node;

identifying a new portion of the data based on a comparison of the data with previous data which has been built for the target node; and reporting to the first device the new portion of the data.

While certain embodiments of the disclosure have been described with reference to examples relating to fraudulent transactions throughout a banking network, it will be appreciated that the apparatus, method and computer program product according to the present embodiment are not so limited in this respect. That is, the messages according to the present embodiment could relate to any type of financial transaction between bank accounts or financial institutions made by any method such as Faster Payments, BACS transfers or the like. Alternatively, embodiments of the present disclosure could be used to report the exchange of messages with relation to any suitable message or transaction, and is not so limited to financial transactions at all. For example, the embodiments of the present disclosure could also be applied to reporting the exchange of messages through a communication network such as a mobile communications network or the like. As such, the present disclosure is not particular limited to the example of transactions in a banking network.

Furthermore, while numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A method of reporting an exchange of messages between nodes in a network, the method comprising:
   receiving from a first device, using circuitry, a first fraud investigation request for data for a target node, the data indicative of an exchange of messages between nodes in a network linked to the target node, the first fraud investigation request indicating that the target node is linked to potentially fraudulent activity, the target node and the nodes being separate from the first device;
   building, by the circuitry, first data indicative of a first exchange of one or more messages between nodes in the network linked to the target node, the first data being built in response to receiving the first fraud investigation request;
   storing, by the circuitry, a record of the fraud investigation request in a database configured to store records corresponding to fraud investigation requests associated with potentially fraudulent activity in the network;
   receiving, from the first device, using the circuitry, a second fraud investigation request for data for the target node, the data indicative of an exchange of messages between nodes in the network linked to the target node, the nodes being separate from the first device;
   determining, by the circuitry, that a fraud investigation request for data for the target node has previously been received, the determination including querying the database to identify the record of the first fraud investigation request, the determination indicating that the target node was subject to the first fraud investigation request;
   based on the determination that the first fraud investigation request was previously received, building, by the circuitry, second data indicative of a second exchange of one or more messages between nodes in the network linked to the target node;
   based on the determination that the first fraud investigation request has previously been received, identifying, by the circuitry, a new portion of the second data based on a comparison of the second data with the first data built for the target node, the new portion of the second data excluding the first data; and
   reporting, to the first device, by the circuitry, the new portion of the second data.

2. The method according to claim 1, wherein the first data and the second data include information regarding a source node, the target node and a message value for each of the one or more messages of the first and the second exchanges.

3. The method according to claim 1, wherein the first and second fraud investigation requests comprise information identifying the target node.

4. The method according to claim 1, wherein the first and second fraud investigation requests comprise an identifier identifying the one or more messages of the first and second exchanges, respectively.

5. The method according to claim 1, wherein the target node is an account in a banking network and wherein the one or more messages of the first and second exchanges include transactions between the accounts.

6. The method according to claim 1, wherein the method comprises replacing, in the database, the first data which has been built for the target node with the second data indicative of the exchange of messages between nodes in the network linked to the target node.

7. The method according to claim 1, wherein the method comprises replacing the first data which has been built for the target node by augmenting the first data with the new portion of the second data and storing the augmented first data in the database.

8. The method according to claim 1, wherein the data indicative of an exchange of messages between nodes in a network linked to the target nodes is a dispersion tree showing the dispersion of messages through the network linked to the target node.

9. The method according to claim 1, wherein the new portion of the second data indicative of the second exchange of one or more messages between nodes in the network linked to the target node includes information identifying new nodes and new messages which were not previously identified as being linked with the target node.

10. The method according to claim 1, wherein the method comprises identifying one or more second devices which have previously made a fraud investigation request for data for the target node; and reporting, to the one or more second devices, by the circuitry, the new portion of the second data.

11. The method according to claim 1, wherein the method further comprises formulating the new portion of the second data into a standardised data structure; and reporting the new portion of the second data in the standardised data structure.

12. The method according to claim 1, wherein the first and second fraud investigation requests include an identifier of the first device; and wherein determining whether a fraud investigation request for the request for data for the target node has previously been received includes determining whether a fraud investigation request for data for the target node has previously been received from the first device.

13. An apparatus for reporting an exchange of messages between nodes in a network, the apparatus comprising circuitry configured to:
   receive from a first device a first fraud investigation request for data for a target node, the data indicative of an exchange of messages between nodes in a network linked to the target node, the first fraud investigation request indicating that the target node is linked to potentially fraudulent activity, the target node and the nodes being separate from than the first device;

build first data indicative of a first exchange of one or more messages between nodes in the network linked to the target node, the first data being built in response to receiving the fraud investigation request;

store a record of the fraud investigation request in a database configured to store records corresponding to fraud investigation requests associated with potentially fraudulent activity in the network;

receive, from the first device, a second fraud investigation request for data for the target node, the data indicative of an exchange of messages between nodes in the network linked to the target node, the nodes being separate from the first device;

determine that a fraud investigation request for data for the target node has previously been received, the determination including querying the database to identify the record of the first fraud investigation request, the determination indicating that the target node was subject to the first fraud investigation request;

based on the determination that the first fraud investigation request was previously received, the circuitry is further configured to:

build second data indicative of a second exchange of one or more messages between nodes in the network linked to the target node;

based on the determination that the first fraud investigation request has previously been received, identify a new portion of the second data based on a comparison of the second data with the first data built for the target node, the new portion of the second data excluding the first data; and report to the first device the new portion of the second data.

14. The apparatus according to claim 13, wherein the new portion of the second data indicative of the second exchange of one or more messages between nodes in the network linked to the target node includes information identifying new nodes and new messages which were not previously identified as being linked with the target node.

15. The apparatus according to claim 13, wherein the apparatus is configured to identify one or more second devices which have previously made a fraud investigation request for data for the target node; and report to the one or more second devices the new portion of the second data.

16. A non-transitory machine-readable medium having instructions stored thereon that, when executed by at least one processor, cause the at least one processor to perform operations comprising:

receiving from a first device a first fraud investigation request for data for a target node, the data indicative of an exchange of messages between nodes in a network linked to the target node, the first fraud investigation request indicating that the target node is linked to potentially fraudulent activity, the target node and the nodes being separate from the first device;

building first data indicative of a first exchange of one or more messages between nodes in the network linked to the target node, the first data being built in response to receiving the fraud investigation request;

storing a record of the fraud investigation request in a database configured to store records corresponding to fraud investigation requests associated with potentially fraudulent activity in the network;

receiving, from the first device, a second fraud investigation request for data for the target node, the data indicative of an exchange of messages between nodes in the network linked to the target node, the nodes being separate from the first device;

determining that a fraud investigation request for data for the target node has previously been received, the determination including querying the database to identify the record of the first fraud investigation request, the determination indicating that the target node was subject to the first fraud investigation request;

based on the determination that the first fraud investigation request was previously received, building second data indicative of a second exchange of one or more messages between nodes in the network linked to the target node;

based on the determination that the first fraud investigation request has previously been received, identifying a new portion of the second data based on a comparison of the second data with the first data built for the target node, the new portion of the second data excluding the first data; and reporting to the first device the new portion of the second data.

17. The non-transitory machine-readable medium according to claim 16, wherein the new portion of the second data indicative of the second exchange of one or more messages between nodes in the network linked to the target node includes information identifying new nodes and new messages which were not previously identified as being linked with the target node.

* * * * *